US006931900B2

(12) United States Patent
Taudt

(10) Patent No.: US 6,931,900 B2
(45) Date of Patent: Aug. 23, 2005

(54) METHOD FOR PRODUCING A HIGH PRESSURE FUEL RESERVOIR

(75) Inventor: Christian Taudt, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/794,208

(22) Filed: Mar. 5, 2004

(65) Prior Publication Data

US 2004/0168494 A1 Sep. 2, 2004

Related U.S. Application Data

(63) Continuation of application No. PCT/DE02/03291, filed on Sep. 5, 2002.

(30) Foreign Application Priority Data

Sep. 6, 2001 (DE) ........................................ 101 43 736

(51) Int. Cl.[7] ............................ B23P 15/26; B23P 9/04
(52) U.S. Cl. ............................ 72/53; 228/125; 29/90.7; 451/39
(58) Field of Search ............................ 72/53; 228/119, 228/125; 29/90.7; 451/39

(56) References Cited

U.S. PATENT DOCUMENTS

| | | | | |
|---|---|---|---|---|
| 2,821,814 A | | 2/1958 | Fritze | 51/11 |
| 3,485,073 A | | 12/1969 | Burney | 72/53 |
| 4,713,882 A | * | 12/1987 | Bianchi et al. | 29/90.7 |
| 4,893,490 A | * | 1/1990 | Isnardon et al. | 72/53 |
| 5,443,201 A | * | 8/1995 | Cartry | 228/125 |
| 5,499,519 A | * | 3/1996 | Brunier et al. | 72/53 |
| 6,189,356 B1 | | 2/2001 | Simeone et al. | 72/53 |
| 6,345,083 B1 | * | 2/2002 | Enomoto et al. | 72/53 |

* cited by examiner

*Primary Examiner*—David B. Jones
(74) *Attorney, Agent, or Firm*—Baker Botts L.L.P.

(57) ABSTRACT

The invention relates to a method for the production of a high-pressure fuel accumulator of an internal engine fitted with an accumulator injection system, wherein a metal hollow pressure accumulator is produced, branches are subsequently made therein for the connection of pressure lines, said branches being respectively provided with a radius on the inner edges thereof leading to a cavity of the pressure accumulator by means of a shot blasting method and a cylindrical lance having a conical tip with a smaller diameter than that of the cavity of the pressure accumulator is guided counter to the direction of the blasting of the balls used for blasting according to said shot blasting method. According to the invention, each inner edge is blasted successively in both directions in which the cavity of the pressure accumulator extends and the lance is respectively guided in an opposite direction.

7 Claims, 1 Drawing Sheet

METHOD FOR PRODUCING A HIGH PRESSURE FUEL RESERVOIR

CROSS-REFERENCE TO RELATED APPLICATION

This application is a continuation of co-pending International Application No. PCT/DE02/03291 filed Sep. 5, 2002 which designates the United States, and claims priority to German application number DE10143736.6 filed Sep. 6, 2001.

TECHNICAL FIELD OF THE INVENTION

The invention relates to a method for producing a high-pressure fuel reservoir for an internal combustion engine with a reservoir injection system, for example, for a diesel internal combustion system with a common-rail injection system.

BACKGROUND OF THE INVENTION

High-pressure fuel reservoirs are most commonly used in diesel engines employing what are known as common-rail systems. In such systems, the fuel is compressed by means of a high-pressure pump to a pressure of more than 1000 to over 2000 bar and supplied to the high-pressure fuel reservoir. From this, pressure lines lead to the injectors of the individual combustion chambers of the internal combustion engine. Given the pressures that prevail, the high-pressure fuel reservoir is subject to a considerable mechanical load, which also fluctuates strongly during operation.

In order to achieve sufficient strength to withstand continuous pressure and continuous pulsing, in particular with a view to the higher injection pressures expected in the future, it makes sense to incorporate intrinsic pressure stresses into the surface of the inner bore of the high-pressure fuel reservoir. This can be done, for example, by means of internal shot peening. A disadvantage with this method, however, is the varying peening effect which occurs in the process at the internal intersecting edges to the line branches, which becomes visible as irregular rounding. On the other hand, an overly pronounced rounding of the internal cut edges is also disadvantageous.

SUMMARY OF THE INVENTION

The object of the invention is to provide a method for increasing the compressive strength of a high-pressure fuel reservoir which avoids the disadvantages in the prior art and allows an optimized peening effect of the internal intersecting edges.

This object is achieved by a method for producing a high-pressure fuel reservoir of an internal combustion engine with a reservoir injection system, for example, for a diesel internal combustion engine with a common-rail injection system, said method comprising the following steps: (a) manufacturing a metal hollow pressure reservoir, and (b) incorporating branches into said reservoir to allow the connection of pressure lines, shot peening said branches to provide a radius at their inner edges leading to a cavity of the pressure reservoir and guiding a cylindrical lance having a cone-shaped tip with a smaller diameter than the cavity of the pressure reservoir counter to a peening direction of the shot used in the shot peening, whereby each inner edge is peened in turn in both directions in which the cavity of the pressure reservoir runs and the lance is guided in the opposite direction in each case.

In a method according to the invention for producing a high-pressure fuel reservoir of an internal combustion engine having a reservoir injection system, in particular of a diesel internal combustion engine with common-rail injection system, wherein, following the production of a hollow pressure reservoir made of metal, branches are incorporated in said pressure reservoir to allow the connection of pressure lines, provision is made for the inner bore and in particular the branches at risk to be treated at their inner edges leading to a cavity of the pressure reservoir by means of a shot peening method. By this means intrinsic pressure stresses are introduced into the material. The formation of radii is a consequence of a treatment of this kind.

In the method, a cylindrical lance having a conical tip with a smaller diameter than the cavity of the pressure reservoir is guided counter to or in a direction of peening of the shot used in the shot peening method. According to the invention, each inner edge of each branch is peened in turn in both directions in which the cavity of the pressure reservoir extends, the lance being guided counter to and/or in the direction of peening respectively.

This method according to the invention has the advantage that the rounding of the inner edges of the branches in the high-pressure reservoir can be manufactured much more regularly and with a constant radius. Peening in both longitudinal directions of the cavity of the pressure reservoir leads to a constant treatment along the entire inner edge of each branch. The lance guided counter to the peening direction of the shot serves to deflect the shot in the direction of the walls of the inner bore of the pressure reservoir. Peening in two directions accordingly leads to a constant rounding depending on the duration of the peening. Peening from both sides ensures that the inner edges are treated evenly on all sides.

In a development of the method according to the invention, rounded-off peening shot is used, i.e. a peening material of defined shot size and defined shot hardness. Shot peening using a peening material of this kind ensures precisely reproducible dimensions and characteristics of the high-pressure reservoir, even when very large batches are processed.

Depending on the desired component strengths and intended use, the high-pressure reservoir can be manufactured from constructional steel, hardened steel, tempering steel, or also from a stainless steel. A preferred embodiment of the invention provides that the high-pressure reservoir is manufactured from wrought steel, which exhibits a particularly high strength and ruggedness in relation to the fluctuating pressure stresses that arise. The types of steel cited can all be strengthened by shot peening to the extent that the inner surface is compressed and consequently a fatigue stress is significantly reduced.

A preferred embodiment of the invention provides that the lance is guided centrically in the pressure reservoir. Owing to the conical tip of the lance, the centric guidance of the essentially cylindrical lance in the similarly cylindrical internal cavity of the pressure reservoir leads to a largely uniform strengthening of the inner surface of the pressure reservoir. The centric guidance can preferably be ensured by the lance having at least three support elements distributed evenly over the cylindrical circumference, whereby said elements can glide in the cavity of the pressure reservoir along its longitudinal extension direction.

BRIEF SUMMARY OF THE DRAWINGS

The invention will now be explained in more detail on the basis of embodiments and with reference to the appended figures, in which.

DETAILED DESCRIPTION OF THE PREFERRED EMBODIMENTS OF THE INVENTION

Figure 1:
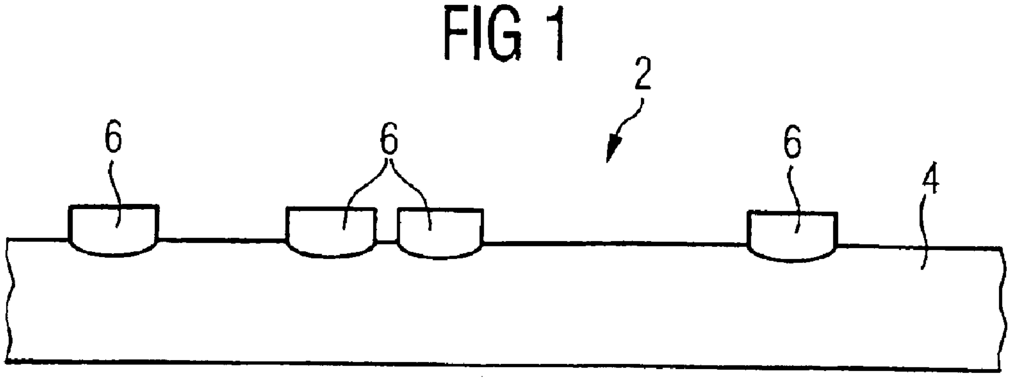
FIG. 1 shows a partial side view of a high-pressure fuel reservoir.

FIG. 1 shows a pressure reservoir 2 which comprises an essentially cylindrical tube 4 made of steel. At the outer circumference of the tube 4 can be seen a plurality of pressure line connections 6, to each of which pressure lines can be connected which lead to injectors of the internal combustion engine. The tube 4 preferably consists of a steel which can be wrought for strength reasons. Suitable materials for the pressure reservoir 2 include, for example, constructional steel, hardening steel, tempering steel or stainless steel, which is preferably wrought.

Figure 2:
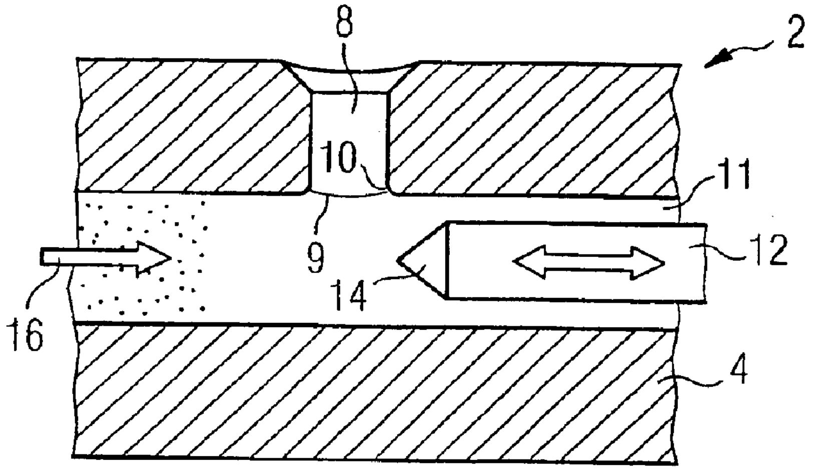
FIG. 2 shows a detail section of a branch of the pressure reservoir according to FIG. 1.

FIG. 2 shows a detail section of a branch 8 of the pressure reservoir 2 according to FIG. 1. In this representation, there can be seen an inner bore 11 which runs essentially cylindrically in the interior of the hollow pressure reservoir 2. A plurality of branches 8 are provided normal to the longitudinal extension direction of the inner bore 11 of the tube 4, of which branches only one can be seen in FIG. 2. The round branch can be implemented for example as a bore which leads centrally into the inner bore 11 of the tube 4. In order to increase the operating strength of the pressure reservoir 2, an inner edge 9 of the branch 8 is provided with a radius 10, which is produced by shot peening. At the same time the shot peening serves to strengthen the inner surface of the tube 4, thereby significantly reducing its fatigue stress. By this means the pressure reservoir 2 can withstand considerable pulsating stresses during operation.

According to the invention, during the shot peening an essentially cylindrical lance 12 is guided along a longitudinal extension direction of the inner bore 11 in the opposite or in the same direction as the peening direction 16, said lance having a conical tip 14 at its end facing the peening direction 16. The conical tip 14 of the lance 12 causes the peening material to be deflected in the direction of the walls of the inner bore 11 and also in the direction of the inner edge 9 of each branch 8, as a result of which each of the inner edges 9 acquires a radius 10. If the inner bore 11 is peened in only one longitudinal extension direction, however, there is the risk of an irregular radius 10 over the circumference of each inner edge 9. It is therefore provided according to the invention that the peening is performed in both directions of the longitudinal extension direction of the tube 4, whereby the lance 12 points with its conical tip 14 in the opposite direction in each case. Accordingly, following a peening of specific duration, as shown in FIG. 2, a peening of equal duration is performed in the opposite direction. In this case, the peening direction 16 would be from right to left, so in this case the conical tip 14 would point toward the right.

Figure 3:
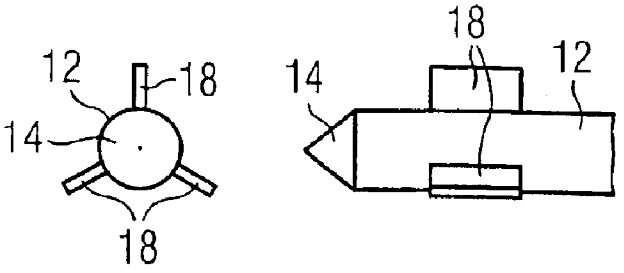
FIG. 3 shows a lance for influencing the rounding according to the inventive method for producing the pressure reservoir.

FIG. 3 shows a lance which serves to influence the rounding in the inventive method for producing the pressure reservoir. The left-hand diagram in FIG. 3 shows a top view of the conical tip 14 of the lance 12. At the outer cylindrical circumference of the lance 12 can be seen a total of three support elements 18 which are evenly distributed in a star shape around the circumference of the lance 12 and which are dimensioned in terms of their length so as to enable a largely play-free gliding motion of the lance 12 in the inner bore 11 of the tube 4. The right-hand diagram of FIG. 3 shows a side view of a lance 12 in which two of the three support elements 18 can be seen.

A material which is particularly suitable for shot peening is what is known as spherical peening shot, which consists of metal spheres of a specific hardness. Each sphere has a diameter of between 0.2 and 0.6 mm, the different diameters in the peening material following a statistical distribution.

Also particularly suitable as peening material is rounded-off peening shot, i.e. a peening material with a defined size and a defined hardness.

List of Reference Characters

2 Pressure reservoir
4 Tube
6 Pressure line connection
8 Branch
9 Inner edge
10 Radius
11 Inner bore
12 Lance
14 Conical tip
16 Peening direction
18 Support element

What is claimed:

1. A method for producing a high-pressure fuel reservoir of an internal combustion engine with a reservoir injection system, for example, for a diesel internal combustion engine with a common-rail injection system, said method comprising the following steps:

a. manufacturing a metal hollow pressure reservoir, and b. incorporating branches into said reservoir to allow the connection of pressure lines, shot peening said branches to provide a radius at their inner edges leading to a cavity of the pressure reservoir and guiding a cylindrical lance having a cone-shaped tip with a smaller diameter than the cavity of the pressure reservoir counter to a peening direction of the shot used in the shot peening, whereby each inner edge is peened in turn in both directions in which the cavity of the pressure reservoir runs and the lance is guided in the opposite direction in each case.

2. A method according to claim 1, wherein an essentially cylindrical pressure reservoir is produced by the method.

3. A method according to claim 1, wherein the shot is rounded-off peening shot.

4. A method according to claim 1, wherein the high-pressure fuel reservoir is manufactured from one of the steels selected from the group consisting of constructional steel, hardening steel, tempering steel, and stainless steel.

5. A method according to claim 1, wherein the high-pressure fuel reservoir is manufactured from wrought steel.

6. A method according to claim 1, wherein the lance is guided centrically in the pressure reservoir.

7. A method according to claim 6, wherein the centric guidance of the lance is effected by means of at least three support elements evenly distributed over the cylindrical circumference of the lance.

* * * * *